United States Patent
Kitagawa et al.

(10) Patent No.: US 8,215,781 B2
(45) Date of Patent: Jul. 10, 2012

(54) MIRROR FOR AN AUTOMOBILE

(75) Inventors: Fumitaka Kitagawa, Fujieda (JP); Akira Fukai, Shimada (JP)

(73) Assignee: Murakami Corporation, Shizuoka-Shi (JP)

( * ) Notice: Subject to any disclaimer, the term of this patent is extended or adjusted under 35 U.S.C. 154(b) by 0 days.

(21) Appl. No.: 12/619,722

(22) Filed: Nov. 17, 2009

(65) Prior Publication Data

US 2010/0188763 A1 Jul. 29, 2010

(30) Foreign Application Priority Data

Jan. 29, 2009 (JP) ................................. 2009-018252

(51) Int. Cl.
*G02B 7/182* (2006.01)
*B23K 26/00* (2006.01)
*B60R 1/06* (2006.01)

(52) U.S. Cl. ................... 359/871; 359/872; 219/121.63; 219/121.65

(58) Field of Classification Search .................. 359/871, 359/872; 219/121.63, 121.65
See application file for complete search history.

(56) References Cited

U.S. PATENT DOCUMENTS

| | | | | | |
|---|---|---|---|---|---|
| 2,202,697 | A | * | 5/1940 | La Hodny | 359/514 |
| 2,307,568 | A | * | 1/1943 | Colbert | 359/514 |
| 2,337,167 | A | * | 12/1943 | Patton | 359/514 |
| 3,171,886 | A | * | 3/1965 | Holt et al. | 359/514 |
| 3,445,151 | A | * | 5/1969 | Stefanakis | 359/514 |
| 3,448,553 | A | * | 6/1969 | Mahler et al. | 359/883 |
| 3,656,830 | A | * | 4/1972 | Kurschner | 359/514 |
| 4,877,214 | A | * | 10/1989 | Toshiaki et al. | 248/483 |
| 5,031,871 | A | * | 7/1991 | Ohta et al. | 248/544 |
| 5,311,368 | A | * | 5/1994 | Tsuyama | 359/872 |
| 5,434,697 | A | * | 7/1995 | Ameer | 359/224.1 |
| 5,621,577 | A | * | 4/1997 | Lang et al. | 359/872 |
| 5,687,035 | A | * | 11/1997 | Lang | 359/864 |
| 5,818,650 | A | * | 10/1998 | Nyhof et al. | 359/876 |
| 5,889,627 | A | * | 3/1999 | Englander et al. | 359/864 |
| 2003/0007265 | A1 | * | 1/2003 | Norman | 359/871 |
| 2006/0139781 | A1 | * | 6/2006 | Waldmann et al. | 359/872 |

FOREIGN PATENT DOCUMENTS

| | | | |
|---|---|---|---|
| DE | 2431047 | * | 1/1976 |
| JP | 59-18634 | | 2/1984 |
| JP | 63-117641 | | 7/1988 |
| JP | 2004-327332 | | 11/2004 |
| JP | 2006-103620 | * | 4/2006 |
| JP | 2006103620 | * | 4/2006 |
| JP | 2008-132875 | | 6/2008 |

OTHER PUBLICATIONS

Japan Office action, dated Mar. 1, 2011 along with an english translation thereof.

* cited by examiner

*Primary Examiner* — Ricky D Shafer
(74) *Attorney, Agent, or Firm* — Greenblum & Bernstein, P.L.C.

(57) ABSTRACT

In a mirror for an automobile, the adoption of resin mirror body to a mirror plate can decrease the weight of the mirror body, and the mirror plate is fixed onto a mirror holder through the welding. Therefore, this eliminates the usage of both-sided adhesive tape or adhesive agent, makes assembly processes less complicated, and thus the reduction in production cost is achieved. Furthermore, since the mirror plate can be fixed onto the mirror holder firmly and strongly even when the mirror plate is not pressed strongly to the mirror holder, excessive load on the mirror holder or the mirror plate becomes avoided. In addition, at the time of the production stage, some dimensional variation in the edge part of the mirror holder or the peripheral edge of the mirror plate becomes easily acceptable.

3 Claims, 9 Drawing Sheets

MIRROR FOR AN AUTOMOBILE

CROSS-REFERENCE TO RELATED APPLICATION

The disclosure of Japanese Patent Application No. JP2009-18252 filed on Jan. 29, 2009 including the specification, drawings and abstract is incorporated herein by reference in its entirety.

BACKGROUND OF THE INVENTION

1. Field of the Invention

The present invention relates to a mirror for an automobile used for room mirror, door mirror, rear mirror and the like.

2. Related Background of the Invention

As a technical art in this field, there has been hitherto Japanese Unexamined Patent Application Publication No. 2008-132875. The mirror for an automobile described in the patent document includes a reflection mirror which is installed on a door mirror body, and the inclination of the reflection mirror is adjustable from right to left or up and down by an electric actuator. Such reflection mirror comprises a mirror plate composed of a transparent glass plate (mirror body), the rear surface of which is deposited with a reflection coating, and a mirror holder which is fixed onto the mirror plate at the rear surface side thereof. In addition, the peripheral edge of the glass plate is covered with the edge part of the mirror holder in order not to expose the peripheral edge of the glass plate.

SUMMARY OF THE INVENTION

The mirror plate of the conventional mirror for an automobile described earlier is retained in fitted state into the edge part of the mirror holder by using elastic force of the mirror holder, and it has been generally adopted that the mirror plate is fixed onto the mirror holder by double-sided adhesive tape or an adhesive agent as a measure to prevent the vibration or rattling. However, the use of double-sided adhesive tape or adhesive agent makes assembly processes complicated and brings about the increase in production cost.

The object of the present invention is to provide a mirror for an automobile intended for simplifying assembly processes.

In a mirror for an automobile according to the present invention, which includes a reflection mirror having a constitution such that a mirror plate is retained by a mirror holder, the mirror plate comprises a mirror body made of transparent resins, and a reflection part formed in the mirror body, and the mirror plate is fixed onto the mirror holder through the welding of abutting area between the mirror holder and the mirror body.

In this mirror for an automobile, the adoption of resin mirror body for the mirror plate makes it possible to obtain weight reduction of the mirror plate, and moreover, fixing the mirror plate onto the mirror holder by the welding eliminates the usage of both-sided adhesive tape or adhesive agent, which makes assembly working less complicated, and thus the reduction in the production cost is achieved. Furthermore, the mirror plate can be fixed firmly and securely onto the mirror holder even if the mirror plate is not pressed strongly onto the mirror holder. Consequently excessive load is not necessarily applied to the mirror holder or the mirror plate, and furthermore, the deterioration of dimensional accuracy can be allowed in abutting part between the mirror holder and the mirror body.

It is preferable that the mirror holder is made of resin material capable of absorbing laser beam, and it is also preferable that the mirror holder has an edge part abutting on the peripheral edge of the mirror plate, and by irradiating the inner wall surface of the edge part with the laser beam having passed through the mirror body of the mirror plate, a melting part formed by melting the inner wall surface of the edge part, fixes the mirror holder onto the mirror plate. By passing the laser beam through the mirror body which is made of transparent resins, the inner wall surface of the mirror holder edge part, which is concealed by the peripheral edge of the mirror plate, can be irradiated with the laser beam. This makes it difficult to allow laser marks to appear on the outer surface of the mirror holder, which enhances external appearance of the reflection mirror. Moreover, since the mirror holder and the mirror plate are joined together via the welding, the mirror plate can be fixed firmly onto the mirror holder.

The melting part is preferably formed by the laser beam which reaches the inner wall surface of the edge part after reflection by the reflection part of the mirror plate. If the laser beam is arranged to be reflected once at the reflecting part and thereafter the edge part of the mirror holder is irradiated with the laser beam, when the laser beam passes through the transparent mirror body, the incidence to the mirror plate of the laser beam becomes easier from above the mirror plate, and thereby the laser beam incidence range can be expanded and operability is enhanced. In other words, the reflection part which is characteristic of the reflection mirror is utilized effectively so that the laser welding is performed.

It is preferable if the melting part is formed by the laser beam which is entered into the mirror body after passing through an opening part formed at the mirror holder edge part and which reaches the inner wall surface of the edge part. By forming the opening part at the mirror holder edge part, the inner wall plane of the mirror holder edge part from the mirror holder side can be adequately irradiated with the laser beam.

DESCRIPTION OF THE PREFERRED EMBODIMENTS

Hereinafter, preferred embodiments of mirrors for an automobile according to the present invention will be described in detail with reference to drawings. It should be noted that there are various mirrors for an automobile such as room mirror, door mirror, rear mirror and the like, but the description will be made by taking a door mirror fixed to the front door of a vehicle as an example.

Figure 1:
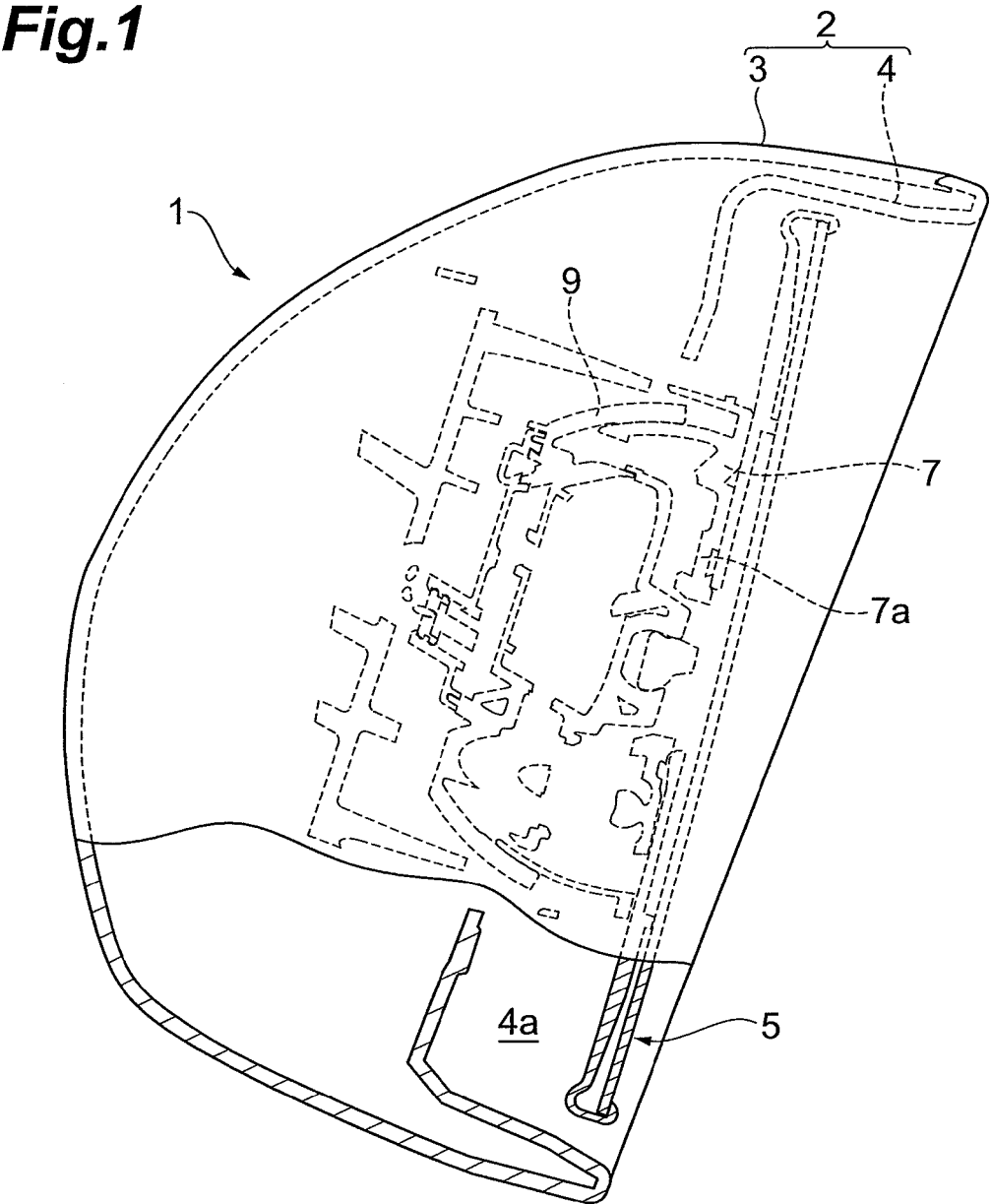
FIG. 1 is a partial sectional view showing the first embodiment of a mirror for an automobile according to the present invention.

(First Embodiment) As shown in FIG. 1, door mirror 1 includes a resin bowl-shaped door mirror body 2 which is fixed to a front side door panel via an arm part, and the door mirror body 2 comprises a casing 3 which has an opening that is opened toward the rear side of a vehicle, and a cup-shaped separating plate 4 which is fixed to the casing 3 just as fitted into the opening of the casing 3.

A reflecting mirror 5 is disposed in the door mirror 1 so as to cover a concave part 4a which is provided in the separating plate 4, and the reflecting mirror 5 is detachably installed on a pivot plate 7. This pivot plate 7 has a circle plate part 7a which is abutted by the rear surface of the reflecting mirror 5 and four claw hook stoppers (not shown) which are disposed in the peripheral part of the circle plate part 7a at equal spaces.

Four resin claws which are provided in the rear surface of the reflection mirror 5 are attached by each claw hook stopper. Accordingly, the reflection mirror 5 is detachable from the pivot plate 7, and the reflection mirror 5 can be removed easily from the pivot plate 7 by pulling the reflection mirror 5 strongly.

Further, two sphere-shaped concave portions (not shown) are formed in a rear surface of the pivot plate 7, and each concave portion is connected with a sphere portion (not shown) which is provided on the head of adjuster nut (not shown) in a ball joint structure. Each adjuster nut is screwed in two adjuster bolts (not shown) respectively which are erected on the cup-shaped holder 9, and each one moves in the axial direction independently while turning on its axis by an actuator (not shown) which is combination of a motor and gears. And the variation of independent movement amount of each respective adjuster nut changes the angle of pivot plate 7, and in accordance with that, the reflection mirror 5 can be changed to the predetermined mirror surface angle.

Figure 2:
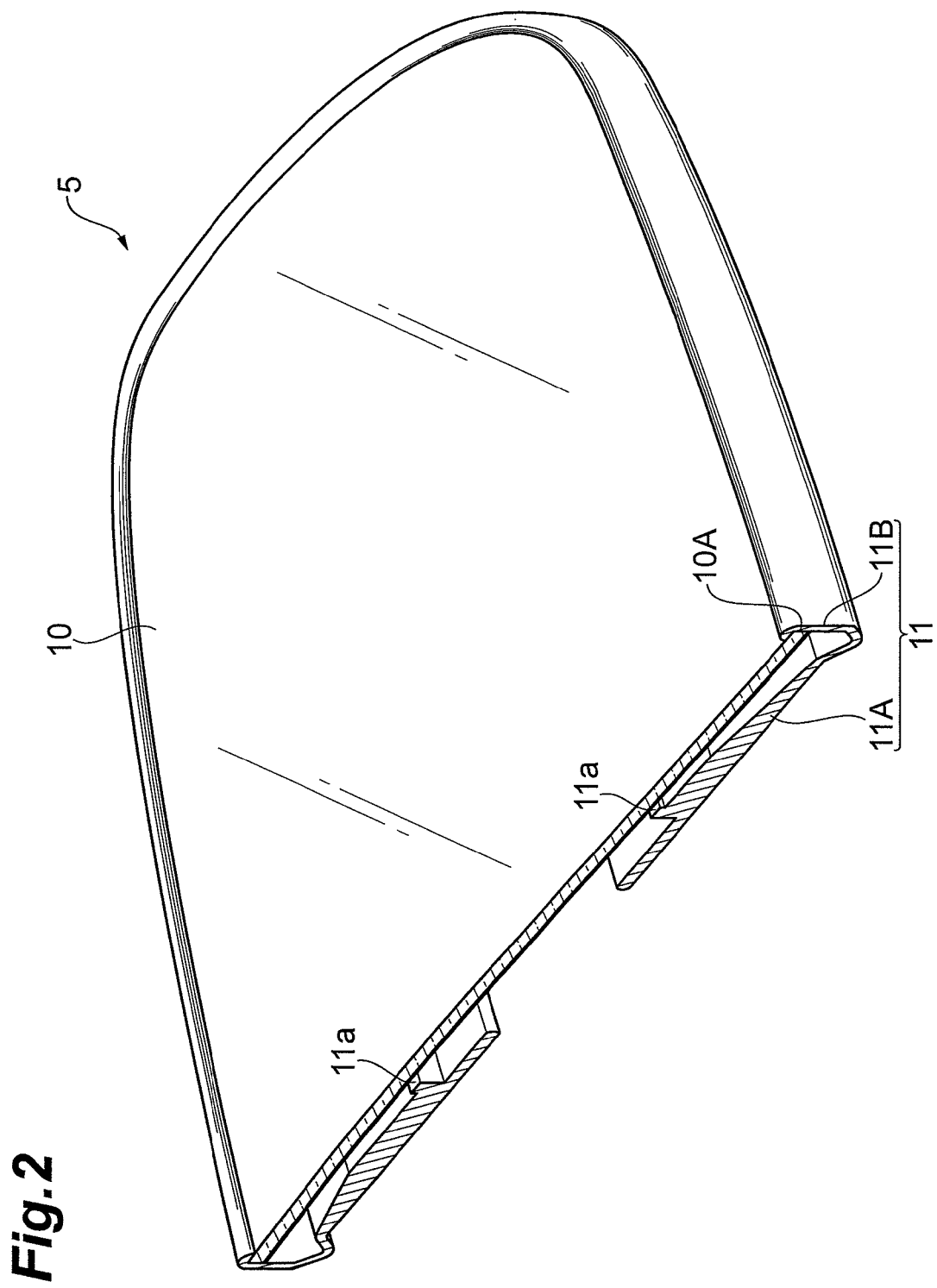
FIG. 2 is a perspective view showing a reflection mirror applied to the mirror for an automobile of FIG. 1.

The reflection mirror 5 applied in the electric-powered door mirror 1 constructed as described so far has, as shown in FIG. 2, a resin mirror holder 11 which is fixed to the mirror plate 10, and the mirror holder 11 is provided with a flat plate part 11A extending along the rear surface of the mirror plate 10 and a edge part 11B which is provided at the end part of the flat plate part 11A, and which abuts on the peripheral edge 10A of the mirror plate 10. On the flat plate part 11A, convex part 11a is formed which abuts on the rear surface of the mirror plate 10 to support the mirror plate 10 from the rear side.

Figure 3:
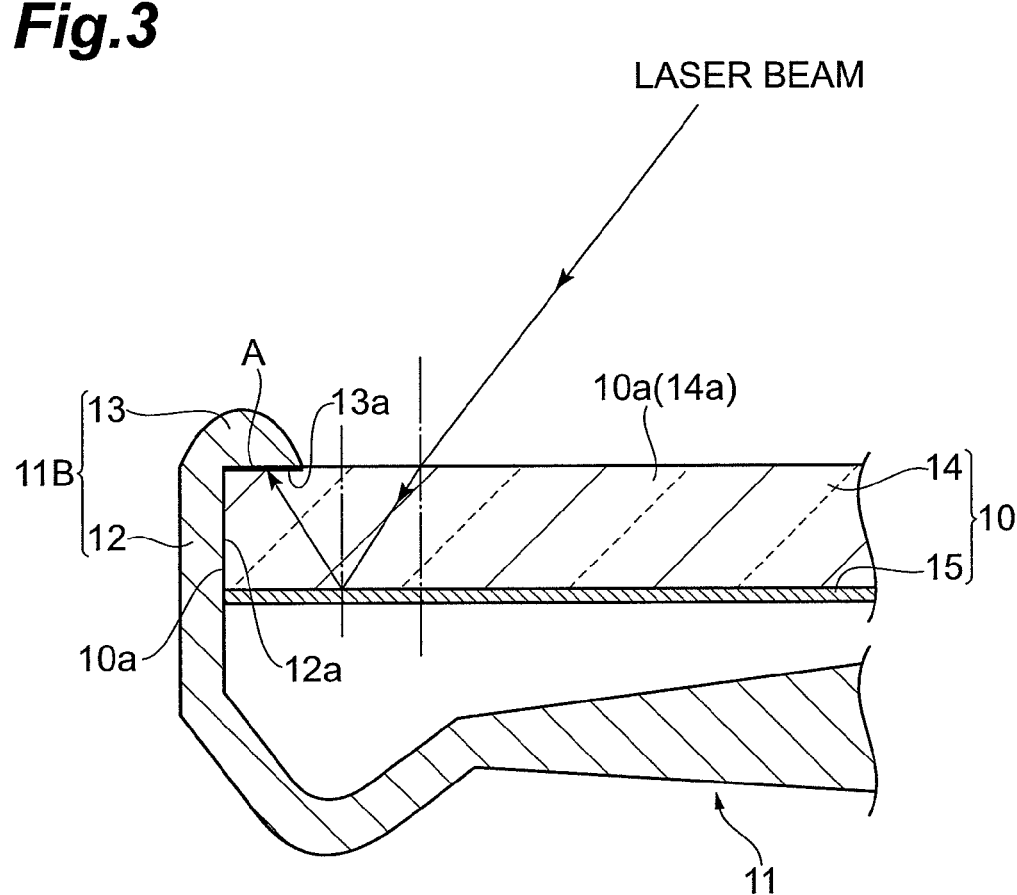
FIG. 3 is a sectional view showing the first example of fixing of a reflection mirror by laser beam.

As shown in FIG. 3, the edge part 11B of the mirror holder 11 abuts on the end surface 10a of the mirror plate 10, and comprises the side edge part 12 which extends along the whole periphery of the mirror plate 10, and upper edge part 13 which protrudes from the end part of the side edge part 12 to abut on the surface 10a of the mirror plate 10.

The mirror plate 10 comprises a flat plate-shaped mirror body 14 made of transparent resins (such as acrylic and polycarbonate) and a reflection part 15 formed on a rear surface of the mirror body 14, which is referred to as so called "rear surface mirror". On the other hand, the mirror holder 11 is formed by black resin material (such as polypropylene) which allows absorption of the laser beam. By welding the abutting area between the mirror holder 11 and the mirror body 14, the mirror plate 10 is fixed onto the mirror holder 11.

(First example of fixing) When fixing the mirror plate 10 onto the mirror holder 11, the laser beam is entered from the side of the surface 14a of the mirror body 14 and the laser beam which has passed through the mirror body 14 is reflected once at the reflection part 15 of the mirror plate 10, and thereafter the laser beam is entered into the inner wall surface 13a of the upper edge part 13 of the mirror holder 11. Because of this, a melting part A is formed in the inner wall surface 13a of the upper edge part 13 of the mirror holder 11, and the melting part A connects the resin mirror body 14 to the mirror holder 11.

Figure 4:
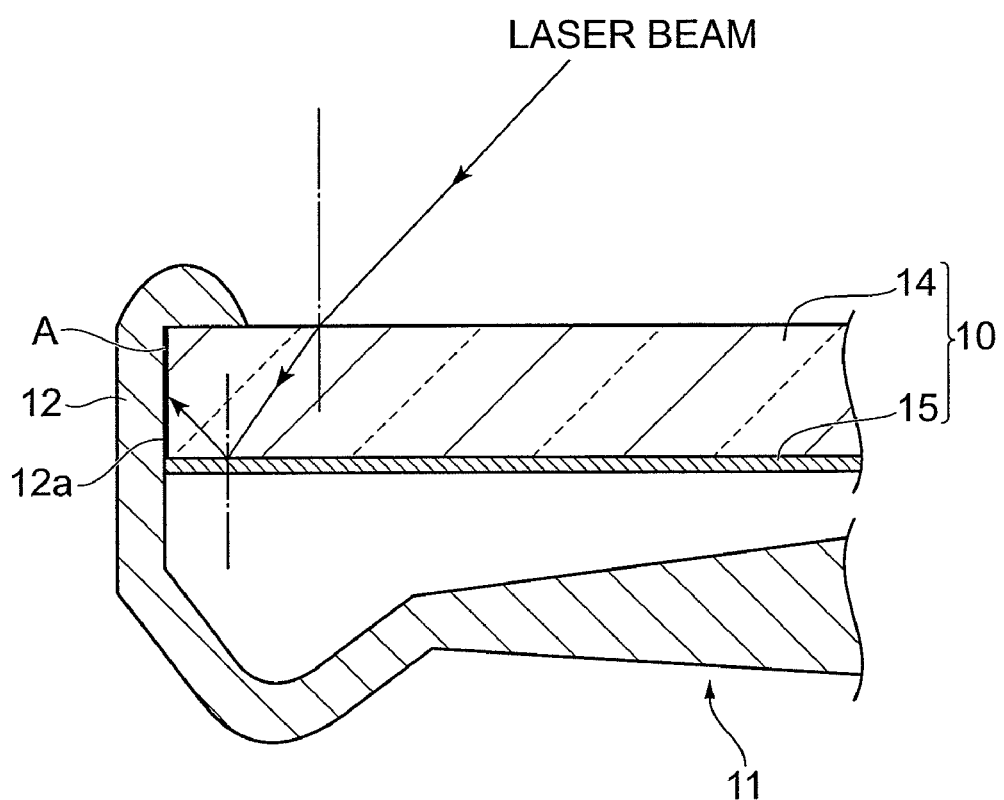
FIG. 4 is a sectional view showing the second example of fixing of a reflection mirror by laser beam.

(Second example of fixing) As shown in FIG. 4, when fixing the mirror plate 10 onto the mirror holder 11, the laser beam is entered from the surface side of the mirror body 14 and the laser beam which has passed through the mirror body 14 is reflected once at the reflection part 15 of the mirror plate 10, and thereafter the laser beam is entered into the inner wall surface 12a of the side edge part 12 of the mirror holder 11. Because of this, a melting part A is formed in the inner wall surface 12a of the side edge part 12 of the mirror holder 11, and the melting part A connects the resin mirror body 14 to the mirror holder 11.

Figure 5:
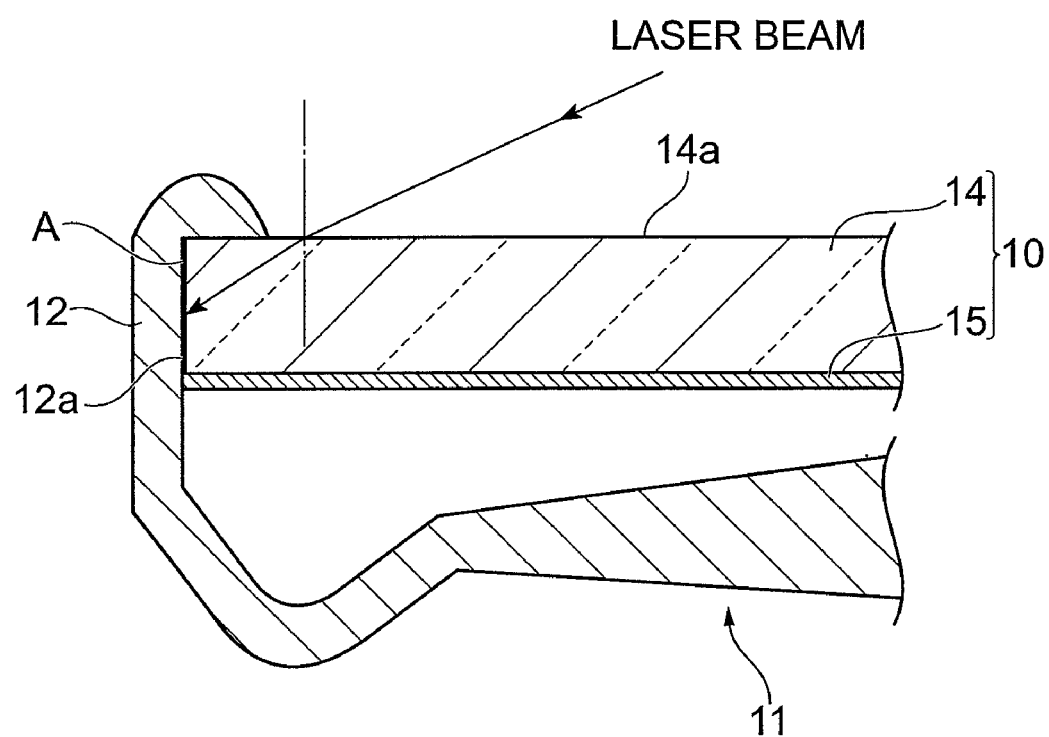
FIG. 5 is a sectional view showing the third example of fixing of a reflection mirror by laser beam.

(Third example of fixing) As shown in FIG. 5, when fixing the mirror plate 10 onto the mirror holder 11, the laser beam is entered from the side of the surface 14a of the mirror body 14 and the laser beam which has passed through the mirror body 14 is entered directly into the inner wall surface 12a of the side edge part 12 of the mirror holder 11. Because of this, a melting part A is formed in the inner wall surface 12a of the side edge part 12 of the mirror holder 11, and the melting part A connects the resin mirror body 14 to the mirror holder 11.

In such mirror 1 for an automobile, adoption of resin mirror body 14 for the mirror plate 10 can reduce the weight of the mirror plate 10, and moreover the mirror plate 10 is fixed onto the mirror holder 11 by the welding, which eliminates both-sided adhesive tape or adhesive agent. Therefore, assembly processes become less complicated, resulting in the reduction in production cost. Furthermore, even if the mirror plate 10 is not strongly pressed for fixing onto the mirror holder 11, the mirror plate 10 can be fixed firmly and securely onto the mirror holder 11. Accordingly, excessive load can be eliminated from the mirror holder 11 or the mirror plate 10 and in addition, at the time of the production stage, some dimensional variation in the edge part 11B of the mirror holder 11 or the peripheral edge 10 of the mirror plate 10 becomes easily acceptable.

Passing the laser beam through the mirror body 14 which is composed of transparent resins allows irradiation of the laser beam in the inner wall surface 12a of the side edge part 12 and/or the inner wall surface 13a of the upper edge part 13 which are concealed by the peripheral edge 10A of the mirror plate 10. Consequently, this can make it difficult for laser marks to appear on the outer surface of the mirror holder 11, which enhances appearance quality of the reflection mirror 5. In addition, since the mirror holder 11 and the mirror plate 10 are joined through the welding of both of the resin materials, the mirror plate 10 can be firmly fixed onto the mirror holder 11, and therefore excellent performance of avoiding rattling of the mirror plate 10 can be expected. Resistance to temperature change is also excellent.

As is evident from the first and second example of fixing, if the laser beam is arranged to be reflected once on the reflection part 15 when the laser beam passes through the transparent mirror body 14 so that the edge part 11B of the mirror holder 11 is irradiated with the laser beam, the laser beam incidence range can be widened because the laser beam is easily entered from the above the mirror plate 10, and thus operative performance is enhanced. In other words, it is the first and second example of fixing in which the laser welding is achieved by utilizing effectively the reflection part 15 which is characteristic of the reflection mirror 5.

Figure 6:
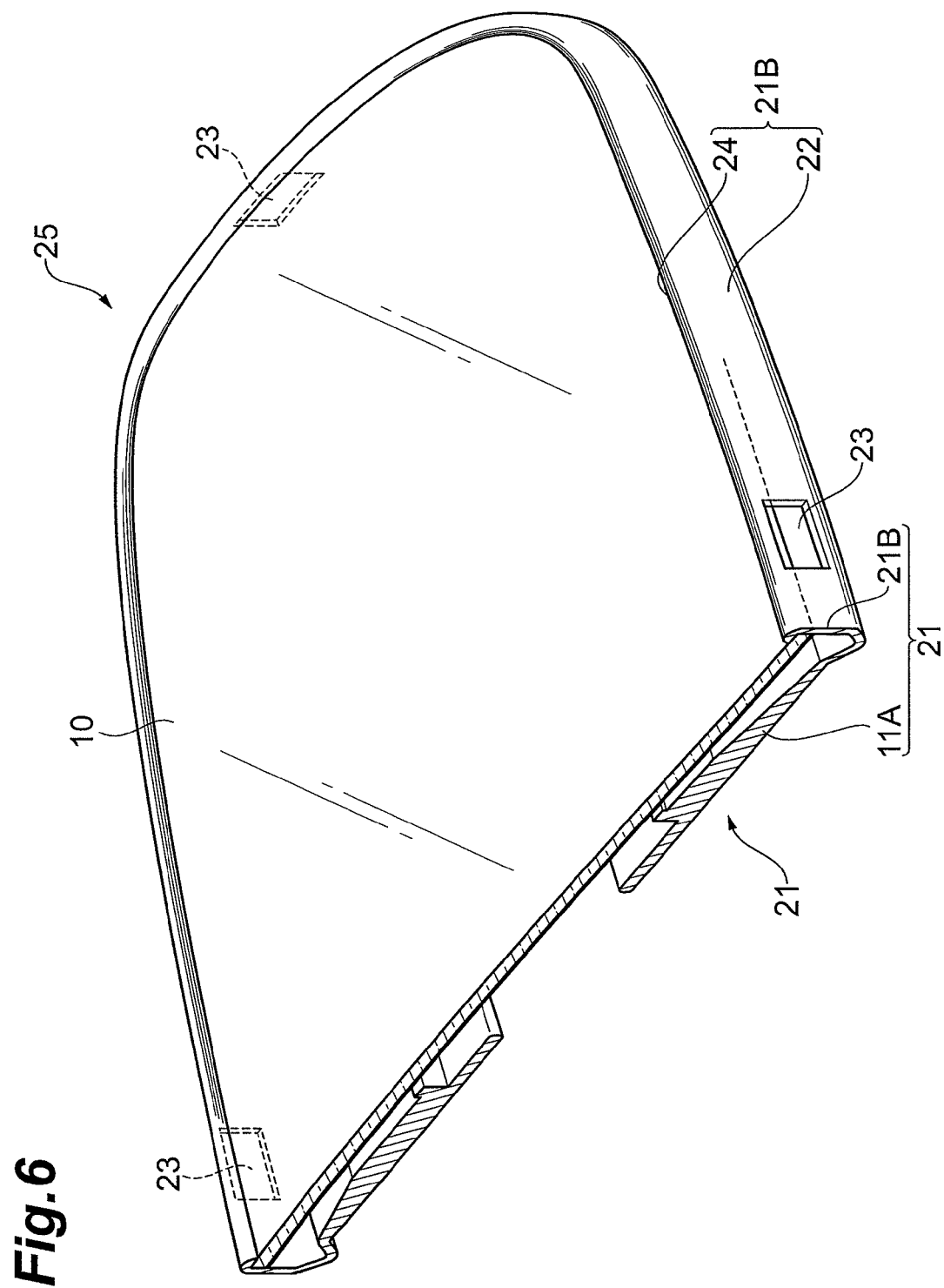
FIG. 6 is a perspective view showing a reflection mirror applied in the second embodiment of a mirror for an automobile according to the present invention.

(Second Embodiment) As shown in FIG. 6, in the reflection mirror 25 which is applied for a mirror for an automobile according to the second embodiment, an opening part 23 is formed for passing through laser beam at the side edge part 22 in the edge part 21B of the mirror holder 21. Other constitution is equivalent to the reflection mirror 5 applied for a mirror 1 for an automobile according to the first embodiment, and thus duplicate explanation is omitted by giving the same number to the same structure.

Figure 7:
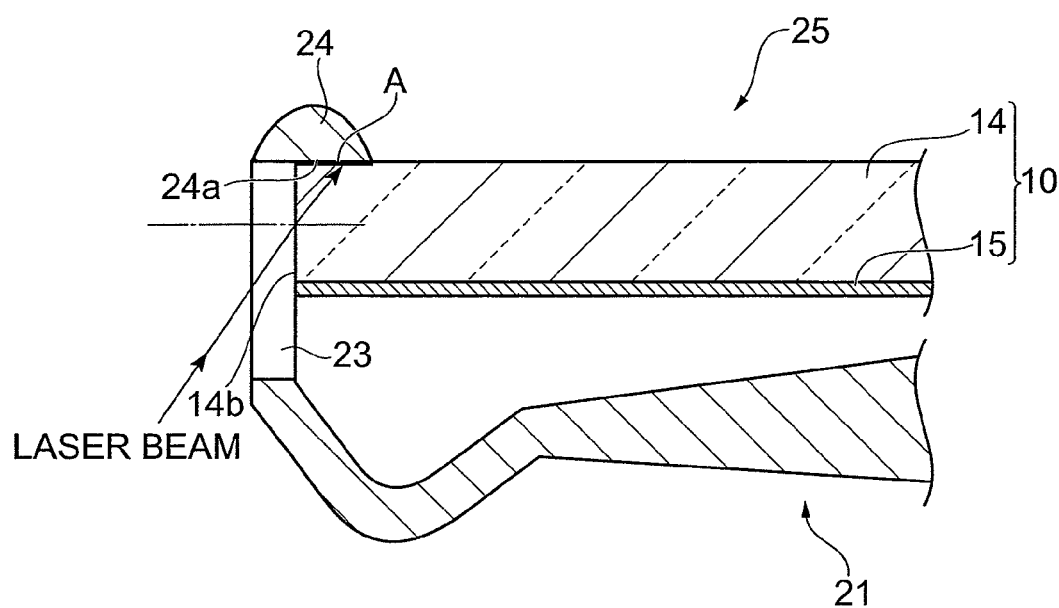
FIG. 7 is a sectional view showing the fourth example of fixing of a reflection mirror by laser beam.

As shown in FIG. 7, the laser beam passes through the opening 23 formed in the side edge part 22 of the mirror holder 21, and thereafter enters from the edge surface 14b of the mirror body 14 to reach the inner wall surface 24a of the upper edge part 24 of the mirror holder 21. Then, melting part A is formed in the inner wall surface 24a of the upper edge part 24 by this laser beam, and thus the mirror plate 10 is fixed onto the mirror holder 21. In this way, forming the opening part 23 in the edge part 21B of the mirror holder 21 allows adequate irradiation of the laser beam towards the inner wall surface 24a of the upper edge part 24 of the mirror holder 21.

Figure 8:
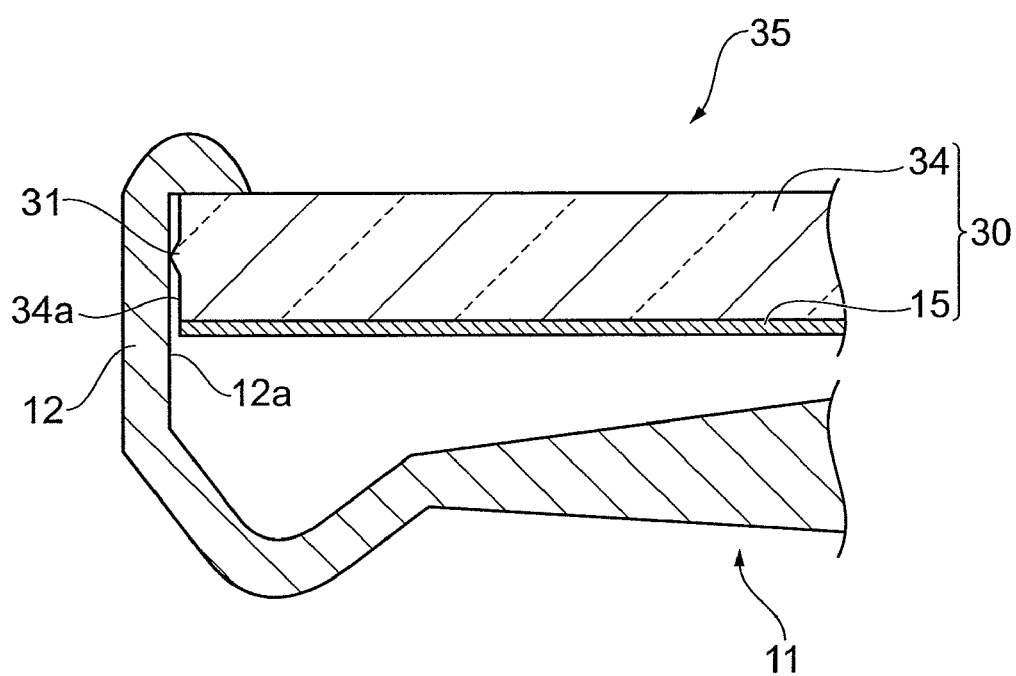
FIG. 8 is a sectional view showing a reflection mirror which allows vibration deposition.

It is needless to say that the present invention is not limited to the aforementioned embodiments. As shown in FIG. 8, for example, in a mirror plate 30 of a reflection mirror 35 according to another example, at the side edge surface 34a of the mirror body 34 which is composed of transparent resins, a plenty of triangular pyramid-shaped protrusions 31 are integrally molded along the whole periphery of the mirror plate 30, and the tip of each protrusion 31 is pressed tightly onto the inner wall surface 12a of the side edge part 12 of the mirror holder 11. In addition, the mirror plate 30 may be fixed onto the mirror holder 11 through melting the protrusions 31 by ultrasonic wave or fine vibration.

Figure 9:
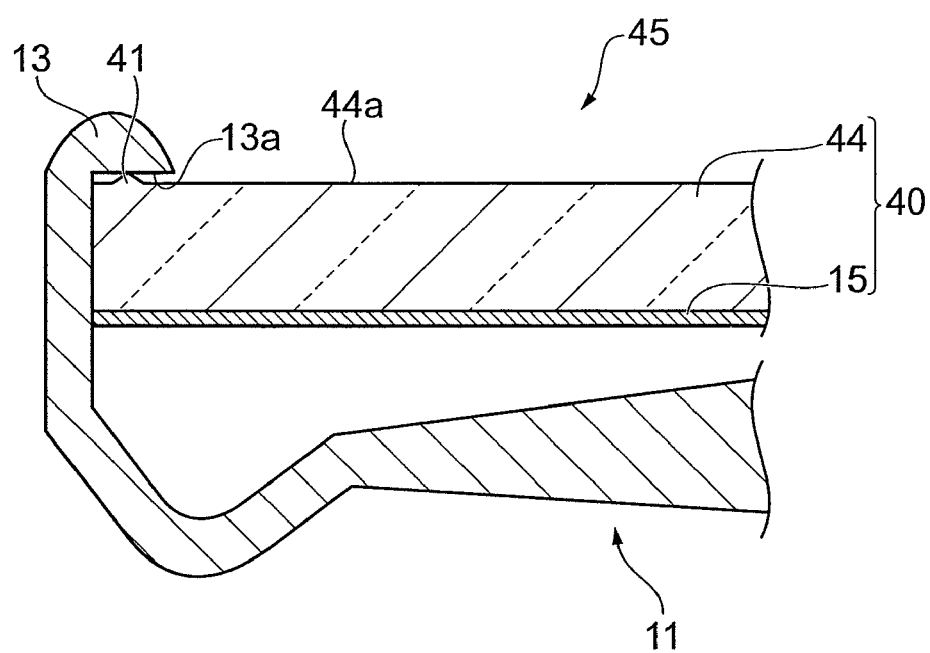
FIG. 9 is a sectional view showing another reflection mirror which allows vibration deposition.

As shown in FIG. 9, in a mirror plate 40 of a reflection mirror 45 according to further another example, in the periphery of the surface 44a of the mirror body 44 which is composed of transparent resins, a plenty of triangular pyramid-shaped protrusions 41 are integrally molded along the whole periphery of the mirror plate 40, and the tip of these protrusions 41 is pressed tightly onto the inner wall surface 13a of the side edge part 13 of the mirror holder 11. In addition, the mirror plate 40 may be fixed onto the mirror holder 11 through melting the protrusions 41 by ultrasonic wave or fine vibration.

Mirrors for an automobile according to the present invention can be applied to various components such as room mirror, door mirror, rear mirror and the like. As a reflection mirror applied to a mirror for automobile according to the present invention, so-called "front surface mirror", not shown though, can be used as well, in which reflection part is provided on a surface side of the mirror body that is made of transparent resins.

According to the present invention, the simplification of assembly processes can be achieved.

What is claimed is:

1. A mirror for an automobile, comprising:
   a casing having an opening; and
   a reflection mirror comprising a mirror plate and a mirror holder, the mirror plate having a mirror body of a transparent resin and a reflection part provided on a rear surface of the mirror body, the mirror body and the mirror holder being positioned within the opening of the casing, the mirror holder supporting the mirror plate, an opening extending through a wall of the mirror holder adjacent to a peripheral edge of the mirror body, and
   a surface of the mirror body is welded onto an inner wall surface of the mirror holder to define an abutting area between the mirror holder and the mirror body,
   wherein the mirror holder comprises a resin that is capable of absorbing a laser beam and has an edge part, the edge part including the inner wall surface of the mirror holder, abutting on a peripheral edge of the surface of the mirror body, and upon irradiating the inner wall surface with the laser beam passing through the mirror body, the inner wall surface is melted onto the mirror body to define the welded abutting area that fixes the mirror holder to the mirror plate,
   wherein the welded abutting area is formed by the laser beam which passes through the mirror body to reach the inner wall surface of the edge part after the laser beam passes through the opening extending through the wall of the mirror holder.

2. The mirror according to claim 1, the mirror holder comprising a peripheral flange that contacts the mirror body along a surface parallel to the reflection part.

3. The mirror according to claim 2, the opening extending through a wall that is transverse to the surface parallel to the reflection part.

* * * * *